(12) United States Patent
Lange (10) Patent No.: US 12,013,968 B2
(45) Date of Patent: Jun. 18, 2024

(54) DATA ANONYMIZATION FOR DATA LABELING AND DEVELOPMENT PURPOSES

(71) Applicant: Robert Bosch GmbH, Stuttgart (DE)

(72) Inventor: Sascha Lange, Vila do Conde (PT)

(73) Assignee: Robert Bosch GmbH, Stuttgart (DE)

( * ) Notice: Subject to any disclaimer, the term of this patent is extended or adjusted under 35 U.S.C. 154(b) by 855 days.

(21) Appl. No.: 17/076,896

(22) Filed: Oct. 22, 2020

(65) Prior Publication Data

US 2022/0129582 A1    Apr. 28, 2022

(51) Int. Cl.
| | | |
|---|---|---|
| *G06F 21/62* | (2013.01) | |
| *G06F 16/48* | (2019.01) | |
| *G06T 5/70* | (2024.01) | |
| *G06T 7/70* | (2017.01) | |
| *G06T 11/00* | (2006.01) | |
| *G10L 21/007* | (2013.01) | |

(Continued)

(52) U.S. Cl.
CPC .......... *G06F 21/6254* (2013.01); *G06F 16/48* (2019.01); *G06T 5/70* (2024.01); *G06T 7/70* (2017.01); *G06T 11/00* (2013.01); *G10L 21/007* (2013.01); *G10L 21/0232* (2013.01); *G10L 25/57* (2013.01); *G06T 2207/10016* (2013.01); *G06T 2207/30201* (2013.01)

(58) Field of Classification Search
CPC .......... G06T 11/00; G06T 2207/10016; G06T 2207/30201; G06T 5/002; G06T 7/70; G10L 21/007; G10L 21/0208; G10L 21/0232; G10L 25/57; G06F 21/6254; G06F 16/48; G06F 21/6263
See application file for complete search history.

(56) References Cited

U.S. PATENT DOCUMENTS

| | | | |
|---|---|---|---|
| 8,098,904 B2 | 1/2012 | Ioffe et al. | |
| 8,305,448 B2 | 11/2012 | Yoda | |
| 11,017,319 B1 * | 5/2021 | Kim | .................. G06F 21/14 |

(Continued)

OTHER PUBLICATIONS

Cohen-Hadria, A. et al., "Voice Anonymization in Urban Sound Recordings," IEEE International Workshop on Machine Learning for Signal Processing, Oct. 2019 (6 pages).

(Continued)

*Primary Examiner* — Gary S Gracia
(74) *Attorney, Agent, or Firm* — Maginot, Moore & Beck LLP (57) ABSTRACT

A method and system are disclosed for anonymizing data for labeling and development purposes. A data storage backend has a database of non-anonymous data that is received from a data source. An anonymization engine of the data storage backend generates anonymized data by removing personally identifiable information from the non-anonymous data. These anonymized data are made available to human labelers who manually provide labels based on the anonymized data using a data labeling tool. These labels are then stored in association with the corresponding non-anonymous data, which can then be used for training one or more machine learning models. In this way, non-anonymous data having personally identifiable information can be manually labelled for development purposes without exposing the personally identifiable information to any human labelers.

19 Claims, 7 Drawing Sheets

(51) Int. Cl.
*G10L 21/0232* (2013.01)
*G10L 25/57* (2013.01)

(56) References Cited

U.S. PATENT DOCUMENTS

| | | | | |
|---|---|---|---|---|
| 11,727,504 B2* | 8/2023 | Cella | ........................ | G06F 18/22 |
| | | | | 705/4 |
| 2014/0278366 A1* | 9/2014 | Jacob | ..................... | G10L 15/30 |
| | | | | 704/235 |
| 2018/0343560 A1* | 11/2018 | Stein | ........................ | H04W 4/02 |
| 2019/0286889 A1* | 9/2019 | DeCovnick | .......... | G06V 40/166 |
| 2019/0371337 A1* | 12/2019 | Bunker | .................. | G10L 15/22 |
| 2020/0034565 A1* | 1/2020 | Kim | ........................ | G06V 20/52 |
| 2020/0082290 A1* | 3/2020 | Pascale | ................. | G06N 20/00 |
| 2020/0227036 A1* | 7/2020 | Miller | .................. | G06V 20/597 |
| 2020/0373002 A1* | 11/2020 | Kadambi | ............... | G16H 30/40 |
| 2020/0395119 A1* | 12/2020 | Lyman | ................. | G06Q 10/105 |
| 2021/0065882 A1* | 3/2021 | McLeod | ................ | G06T 7/187 |
| 2021/0067694 A1* | 3/2021 | Alshurafa | ................ | H04N 7/18 |
| 2021/0124906 A1* | 4/2021 | Srivastava | ........... | G06V 10/764 |
| 2021/0158636 A1* | 5/2021 | Olshansky | ......... | G06Q 10/1053 |
| 2021/0209734 A1* | 7/2021 | Simhadri | .............. | G06V 40/164 |
| 2021/0294918 A1* | 9/2021 | Pasupuleti | ............... | G10L 15/16 |
| 2021/0334455 A1* | 10/2021 | Gkoulalas-Divanis | ...................... | |
| | | | | G06F 40/216 |
| 2021/0368279 A1* | 11/2021 | Shayne | .................... | G10L 25/78 |
| 2021/0377580 A1* | 12/2021 | Malboubi | ........ | H04N 21/47214 |
| 2022/0012362 A1* | 1/2022 | Kuta | ..................... | G06F 18/213 |
| 2022/0083606 A1* | 3/2022 | Drost | ...................... | G06F 16/93 |
| 2022/0129582 A1* | 4/2022 | Lange | ................ | G10L 21/0232 |

OTHER PUBLICATIONS

Hukkelås, H. et al., "DeepPrivacy: A Generative Adversarial Network for Face Anonymization," arXiv:1909.04538v1, Sep. 2019, https://arxiv.org/abs/1909.04538 (14 pages).

Qian, J. et al., "VoiceMask: Anonymize and Sanitize Voice Input on Mobile Devices," arXiv:1711.11460v1, Nov. 2017, https://arxiv.org/abs/1711.11460 (10 pages).

* cited by examiner

DATA ANONYMIZATION FOR DATA LABELING AND DEVELOPMENT PURPOSES

FIELD

The device and method disclosed in this document relates to data privacy and, more particularly, to data anonymization for data labeling and development purposes.

BACKGROUND

Unless otherwise indicated herein, the materials described in this section are not admitted to be the prior art by inclusion in this section.

Many artificial intelligence and machine learning based software technologies rely on large, well-labeled datasets for training and development. Often, well-labeled datasets must, at least in part, be labeled manually by a human using a labeling tool or the like. However, this presents challenges when the available data for labelling has been collected incident to some other purpose and includes personally identifiable information that cannot legally or ethically be exposed to a team of human data labelers.

As an example, a service provider might provide a product or service that involves capturing audio or video of its users for the purpose of providing features of the product or service. This captured audio and video data could be advantageously used by the service provider for development purposes relating to the product or service, or for the development of an unrelated product or service. However, since the captured audio and video data often includes personal identifiable information of the users (e.g., the users' voices or faces), there may be legal or ethical issues with using the captured audio and video data such purposes.

It would be advantageous to provide a system or method for removing personal identifiable information from data that is to be labeled by human labelers. Moreover, it would be advantageous if the system or method facilitates accurate labeling of the data, notwithstanding the removal of personal identifiable information from the data.

SUMMARY

A method for labeling data is disclosed. The method comprises storing, in a memory of a server, a plurality of data files, the data files including at least one of videos, images, and audio clips, at least some of the plurality of data files including personally identifiable information of individual people. The method further comprises generating, with a processor of the server, a plurality of anonymized data files by removing the personally identifiable information from each of the plurality of data files, each of the plurality of anonymized data files being generated based on corresponding one of the plurality of data files. The method further comprises labeling the plurality of data files by, for each respective anonymized data file in the plurality of anonymized data files: (i) transmitting, with a transceiver of the server, the respective anonymized data file to a respective client device in a plurality of client devices; (ii) receiving, with the transceiver, at least one label for the respective anonymized data file from the respective client device; and (iii) storing, in the memory, the at least one label in association with a respective data file in the plurality of data files that corresponds to the respective anonymized data file.

A system for labeling data is disclosed. The system includes a transceiver configured to communicate with a plurality of client devices. The system includes a memory configured to store a plurality of data files, the data files including at least one of videos, images, and audio clips, at least some of the plurality of data files including personally identifiable information of individual people. The system includes a processor operably connected to the transceiver and the memory. The processor is configured to generate a plurality of anonymized data files by removing the personally identifiable information from each of the plurality of data files, each of the plurality of anonymized data files being generated based on corresponding one of the plurality of data files. The processor is further configured to label the plurality of data files by, for each respective anonymized data file in the plurality of anonymized data files, (i) operating the transceiver to transmit the respective anonymized data file to a respective client device in the plurality of client devices, (ii) operating the transceiver to receive at least one label for the respective anonymized data file from the respective client device, (iii) and writing, to the memory, the at least one label in association with a respective data file in the plurality of data files that corresponds to the respective anonymized data file.

A non-transitory computer-readable medium for labeling data is disclosed. The computer-readable medium stores program instructions that, when executed by a processor, cause the processor to read, from a memory, a plurality of data files, the data files including at least one of videos, images, and audio clips, at least some of the plurality of data files including personally identifiable information of individual people. The computer-readable medium further stores program instructions that, when executed by a processor, cause the processor to generate a plurality of anonymized data files by removing the personally identifiable information from each of the plurality of data files, each of the plurality of anonymized data files being generated based on corresponding one of the plurality of data files. The computer-readable medium further stores program instructions that, when executed by a processor, cause the processor to label the plurality of data files by, for each respective anonymized data file in the plurality of anonymized data files, (i) operating a transceiver to transmit the respective anonymized data file to a respective client device in a plurality of client devices, (ii) operating the transceiver to receive at least one label for the respective anonymized data file from the respective client device, (iii) and writing, to the memory, the at least one label in association with a respective data file in the plurality of data files that corresponds to the respective anonymized data file.

BRIEF DESCRIPTION OF THE DRAWINGS

The foregoing aspects and other features of the method and system are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

Figure 1:
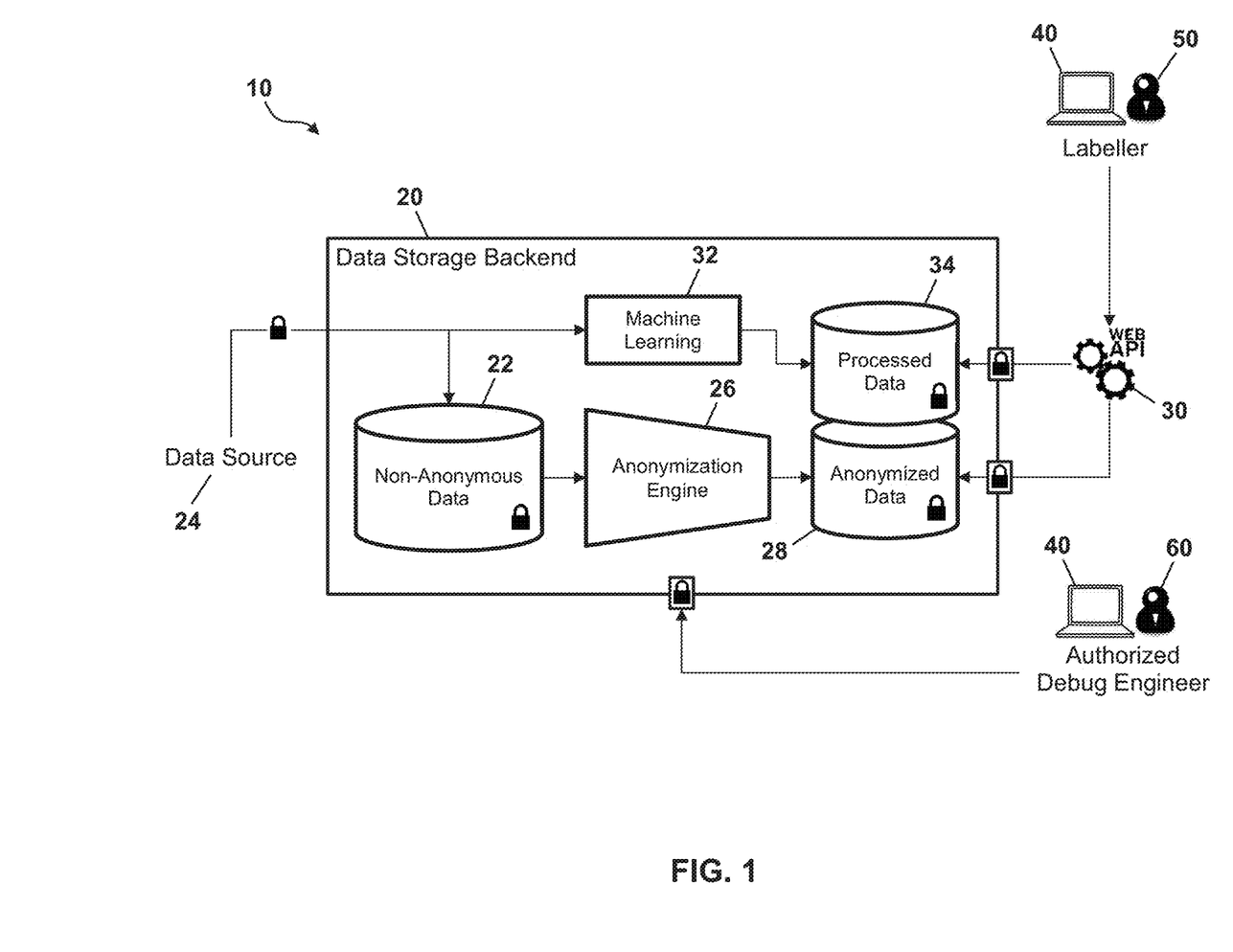
FIG. 1 shows a system for anonymizing data for labeling and development purposes.

FIG. 1 shows a system 10 for anonymizing data for labeling and development purposes. The system 10 includes data storage backend 20 having a database 22 of non-anonymous data that is received from a data source 24. Particularly, in at least some embodiments, the non-anonymous data includes media files such as videos, images, and/or audio clips. The non-anonymous data 22 includes personally identifiable information, which generally should not be exposed. In at least one embodiment, the data source 24 includes non-anonymous data is been collected incident to the provision of some product or service. For example, the non-anonymous data may include video and audio captured of a cabin of a vehicle during ridesharing rides, taxi rides, or vehicle rentals provided by a mobility service provider. Thus, in this example, the collected video includes faces of people in the vehicle and the collected audio includes voices of the people in the vehicle.

The data storage backend 20 includes an anonymization engine 26, which is executed to remove the personally identifiable information from the non-anonymous data 22 and populate a database 28 of anonymized data. The anonymized data 28 is made accessible to human labelers 50 via web API 30 for the purpose of labeling. Particularly, using a labeling tool (e.g., an application or equivalent web interface) on a personal computing device 40, the human labelers 50 receive individual files from the anonymized data 28 via the web API 28 and manually add labels to the individual data files. The data storage backend 20 receives the labels from personal computing devices 40 of the human labelers 50 and stores the labels in association with the corresponding non-anonymous data, either in the database 22 or in some other database designated for labeled data (not shown). In this way, the non-anonymous data 22 can be labeled by the human labelers 50, while generally only exposing the human labelers 50 to the corresponding anonymized data 28.

The labels and the corresponding non-anonymous data 22 can be used to train one or more machine learning models 32 that are executed to process new data collected from the data source 24. The machine learning models 32 are generally supervised or semi-supervised learning models that are configured to infer an output based on new data collected from the data source 24, such as a classification of the new data. The machine learning models 32 may be implemented using a wide variety of techniques, such as convolution neural networks, recurrent neural networks, support vector machines, and the like. The processed data is stored in a database 34. In very limited circumstances, the processed data 34 and/or the unprocessed non-anonymous data 22 may be partially made available to the human labeler 50 via the web API 30

It should be appreciated that the machine learning models 32 can be configured to perform a wide variety of processing tasks, which may or may not relate to the product or service incident to which the data is collected, and which is generally beyond the scope of this disclosure. Likewise, the particular labels that are added by the human labelers 50 generally related closely to tasks performed by the machine learning models 32 and, thus, the particular labels also vary widely depending on task performed by the machine learning models 32. Using the example above in which the data includes video and audio captured of a cabin of a vehicle, the machine learning model 32 may, for example, be configured to detect violence, arguments, or other disputes between the people in video and audio, to predict the emotion state of the people in video and audio, or infer other metadata relating to the passengers. Thus, the labels may comprise similar classifications of the scene of the cabin of the vehicle and of the status of the passengers.

For the purposes of developing the machine learning models 32, generally no regular developer has access to the processed data 34 and/or the unprocessed non-anonymous data 22. However, in limited circumstances, an authorized debug engineer 60 using a personal computing device 40 may access certain files from the processed data 34 and/or the unprocessed non-anonymous data 22, via an access management mechanism. For example, if a wrong label is assigned (either by the human labeler 50 or by the machine learning models 32), the authorized debug engineer 60 may need to view the processed data 34 and/or the unprocessed non-anonymous data 22 to re-label the data or to find a bug in a machine learning model 32. Similarly, if the anonymization process fails, the authorized debug engineer 60 or human labeler 50 may need to manually label the processed data 34 and/or the unprocessed non-anonymous data 22.

Exemplary Hardware Embodiments

Figure 2A:
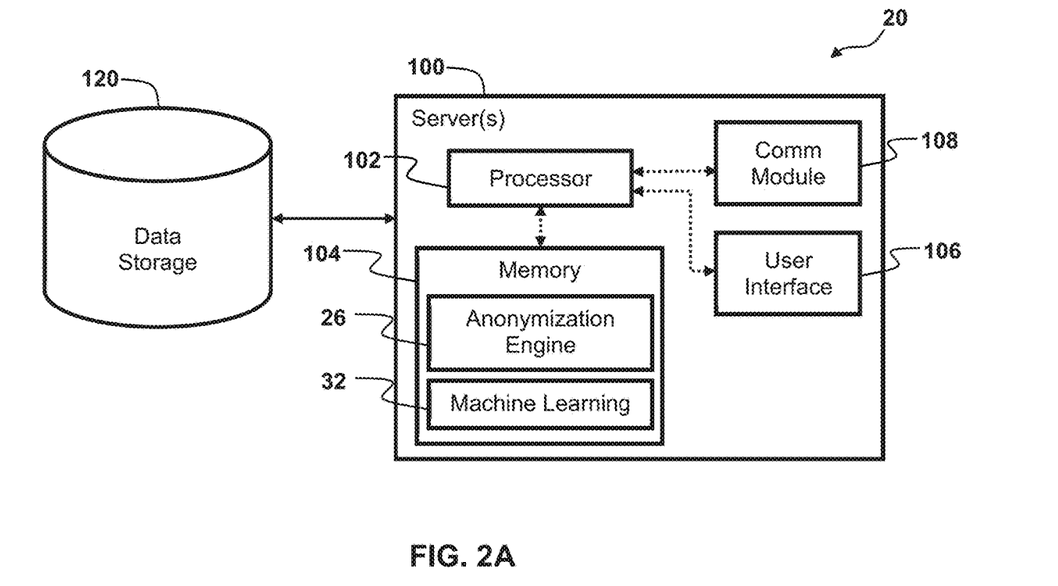
FIG. 2A shows exemplary hardware components of the data storage backend.
Figure 2B:
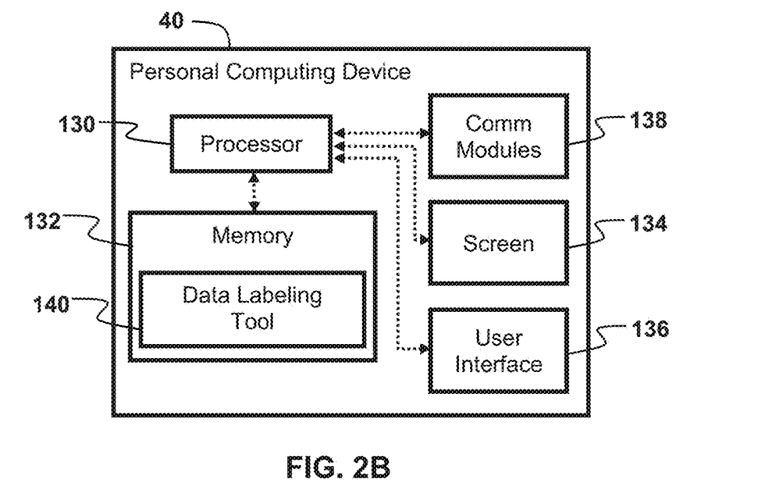
FIG. 2B shows exemplary hardware components of the personal computer devices.

With reference now to FIGS. 2A-2B, exemplary components of the data storage backend 20 and of the personal computing devices 40 are described. It will be appreciated that the components of the data storage backend 20 and of the personal computing devices 40 shown and described herein are merely exemplary and that the data storage backend 20 and of the personal computing device 40 may comprise any alternative configuration.

As shown in FIG. 2A, the exemplary embodiment of the data storage backend 20 comprises one or more servers 100 and one or more data storage devices 120. The servers 100 may include servers configured to serve a variety of functions for the data storage backend 20, at least including one or more database servers configured to manage the data collected from the data source 24 and stored in the data storage devices 120, but in some embodiments also including web servers or application servers depending on the features provided by data storage backend 20. Each of the servers 100 includes, for example, a processor 102, a memory 104, a user interface 106, and a network communications module 108. It will be appreciated that the illustrated embodiment of the servers 100 is only one exemplary embodiment of a server 100 and is merely representative of any of various manners or configurations of a personal computer, server, or any other data processing systems that are operative in the manner set forth herein.

The processor 102 is configured to execute instructions to operate the servers 100 to enable the features, functionality, characteristics and/or the like as described herein. To this end, the processor 102 is operably connected to the memory 104, the user interface 106, and the network communications module 108. The processor 102 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 102 may include a system with a central processing unit, graphics processing units, multiple processing units, dedicated circuitry for achieving functionality, programmable logic, or other processing systems.

The data storage devices 120 are configured to store data including the non-anonymous data 22 received from the data source 24, the anonymized data 28, and the processed data 34. The data storage devices 120 may be of any type of long-term non-volatile storage device capable of storing information accessible by the processor 102, such as hard drives or any of various other computer-readable storage media recognized by those of ordinary skill in the art. The data storage backend 20 is configured to store and manage the data on the data storage devices 120 in an encrypted and secure manner and to provide limited access to the data to the human labelers 50 and authorized debug engineers 60, as well as authorized third parties, via a web interface or API (e.g., the web API 30) that includes controlled access and identity management.

The memory 104 of each server 100 is configured to store program instructions that, when executed by the processor 102, enable the servers 100 to perform various operations described herein, including managing, anonymizing, and processing the data stored in the data storage devices 120. Particularly, the memory 104 stores programs instructions corresponding to the anonymization engine 26 and the machine learning models 32. The memory 104 may be of any type of device or combination of devices capable of storing information accessible by the processor 102, such as memory cards, ROM, RAM, hard drives, discs, flash memory, or any of various other computer-readable media recognized by those of ordinary skill in the art.

The network communications module 108 of the servers 100 provides an interface that allows for communication with any of various devices, at least including the data source 24 and the personal computing devices 40. In particular, the network communications module 108 may include a local area network port that allows for communication with any of various local computers housed in the same or nearby facility. Generally, the servers 100 communicate with remote computers over the Internet via a separate modem and/or router of the local area network. Alternatively, the network communications module 108 may further include a wide area network port that allows for communications over the Internet. In one embodiment, the network communications module 108 is equipped with a Wi-Fi transceiver or other wireless communications device. Accordingly, it will be appreciated that communications with the servers 100 may occur via wired communications or via the wireless communications and may be accomplished using any of various known communications protocols.

The servers 100 may be operated locally or remotely by an administrator. To facilitate local operation, the servers 100 may include a user interface 106. In at least one embodiment, the user interface 106 may suitably include an LCD display screen or the like, a mouse or other pointing device, a keyboard or other keypad, speakers, and a microphone, as will be recognized by those of ordinary skill in the art. Alternatively, in some embodiments, an administrator may operate the servers 100 remotely from another computing device which is in communication therewith via the network communications module 108 and has an analogous user interface.

As shown in FIG. 2B, the exemplary embodiment of the personal computing device 40 comprises a processor 130, a memory 132, a display screen 134, a user interface 136, and at least one network communications module 138. It will be appreciated that the illustrated embodiment of the personal computing device 40 is only one exemplary embodiment is merely representative of any of various manners or configurations of a personal computer, laptop computer, tablet computer, smartphone, or any other computing devices that are operative in the manner set forth herein.

The processor 130 is configured to execute instructions to operate the personal computing device 40 to enable the features, functionality, characteristics and/or the like as described herein. To this end, the processor 130 is operably connected to the memory 132, the display screen 134, and the network communications module 138. The processor 130 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 130 may include a system with a central processing unit, graphics processing units, multiple processing units, dedicated circuitry for achieving functionality, programmable logic, or other processing systems.

The memory 132 is configured to store data and program instructions that, when executed by the processor 130, enable the personal computing device 40 to perform various operations described herein. The memory 132 may be of any type of device capable of storing information accessible by the processor 130, such as a memory card, ROM, RAM, hard drives, discs, flash memory, or any of various other computer-readable medium serving as data storage devices, as will be recognized by those of ordinary skill in the art.

The display screen 134 may comprise any of various known types of displays, such as LCD or OLED screens. The user interface 136 may include a variety of interfaces for operating the personal computing device 40, such as a buttons, switches, a keyboard or other keypad, speakers, and a microphone. Alternatively or in addition, the display screen 134 may comprise a touch screen configured to receive touch inputs from a user.

The network communications module 138 may comprise one or more transceivers, modems, processors, memories, oscillators, antennas, or other hardware conventionally included in a communications module to enable communications with various other devices, at least including the data source 24. Particularly, the network communications module 138 generally includes a Wi-Fi module configured to enable communication with a Wi-Fi network and/or Wi-Fi router (not shown) configured to enable communication the data storage backend 20. Additionally, the network communications module 138 may include a Bluetooth® module (not shown), as well as one or more cellular modems configured to communicate with wireless telephony networks.

The personal computing device 40 may also include a respective battery or other power source (not shown) configured to power the various components within the personal computing device 40. In one embodiment, the battery of the personal computing device 40 is a rechargeable battery configured to be charged when the personal computing device 40 is connected to a battery charger configured for use with the personal computing device 40.

In at least one embodiment, the memory 132 stores program instructions of a local data labeling tool 140 and/or of a web browser configured to access an equivalent web-based data labeling tool 140. As discussed in further detail below, the processor 130 is configured to execute program instructions of the data labeling tool 140 to enable the human labeler 50 to add labels to individual data files, generally using only the anonymized data 28.

A variety of methods and processes are described below for operating the data storage backend 20 and/or the personal computing device 40. In these descriptions, statements that a method, processor, and/or system is performing some task or function refers to a controller or processor (e.g., the processor 102 of the data storage backend 20 or the processor 130 of the personal computing device 40) executing programmed instructions stored in non-transitory computer readable storage media (e.g., the memory 104 of the data storage backend 20 or the memory 132 of the personal computing device 40) operatively connected to the controller or processor to manipulate data or to operate one or more components in the system 10 to perform the task or function. Additionally, the steps of the methods may be performed in any feasible chronological order, regardless of the order shown in the figures or the order in which the steps are described.

Data Anonymization

As discussed above, the data collected from the data source 24 generally includes media files such as videos, images, and/or audio clips. These data collected from the data source 24 are stored in the data storages devices 120 of the data storage backend 20. At least some of the videos, images, and/or audio clips include personally identifiable information that cannot legally or ethically be exposed to a team of human data labelers. As used herein and as will be recognized by those of ordinary skill in the art, the term "personally identifiable information" or "PII" refers to any representation of information that, when used alone or with other relevant data, permits the identity of an individual to whom the information applies to be reasonably inferred by either direct or indirect means. Examples of personally identifiable information would typically be included in media files include faces and other uniquely identifiable visual features of people in videos or images, voices or uniquely identifiable audible features of people in audio clips, and certain words or contextual information spoken in videos or audio.

The processor 102 of the of data storage backend 20 is configured to execute program instructions of anonymization engine 26 to generate a plurality of anonymized data files, which are to be stored in the database 28, based on the non-anonymous data files 22. The processor 102 generates each anonymized data file by removing the personally identifiable information from a corresponding one of the non-anonymous data files 22. Naturally, each type of data file generally requires a different approach for removing personally identifying information. Exemplary methods for anonymizing data collected from the data source 24 are discussed below for video, images, audio clips, and combined audio/video.

Figure 3:
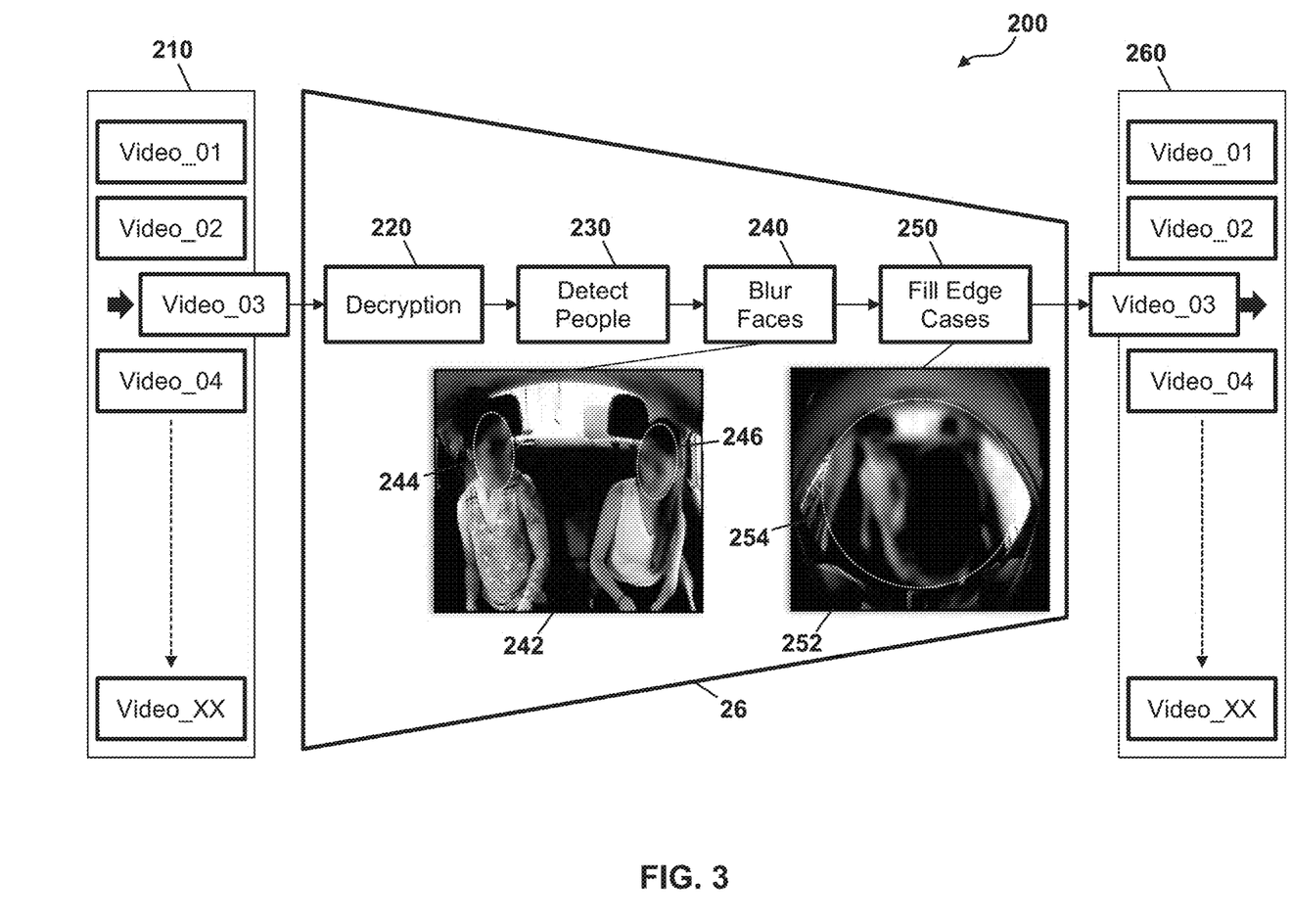
FIG. 3 shows a process for anonymizing video data to blur the faces of people in the video, such that they cannot be recognized or personally identified.

FIG. 3 shows a process 200 for anonymizing video data to blur the faces of people in the video, such that they cannot be recognized or personally identified. The process 200 begins with a step of receiving a video file (block 210) and, if necessary, decrypting the video file (block 220). Particularly, the processor 102 of the data storage backend 20 reads from the data storage devices 120 an individual video file (e.g., "Video_03") from a plurality of video files stored in the non-anonymous data 22. In at least some embodiments, each individual file of the non-anonymous data 22 is encrypted, for example with a unique key associated with an end user of the product or service from which the data is collected. In these cases, the processor 102 decrypts the video file using the appropriate key.

The process 200 continues with detecting people in each frame of the video and determining a location of a face of each person in each frame (block 230). Particularly, for each respective frame in the video file, the processor 102 detects people in the frame and determines a location or region within the frame that corresponds to the face of each person. In at least one embodiment, the processor 102 detects the people in the frame and determines the location of the face using a human pose estimation algorithm. It will be appreciated by those of ordinary skill in the art that human pose estimation algorithm is generally an algorithm that determines a set of key points or coordinates within the frame that correspond to particular joints or key features of a person, and which collectively form a pose skeleton of the person. These key points may, for example, include feet, knees, hips, hands, wrists, fingers, knuckles elbows, shoulders, head, eyes, mouth, and the like. It will be appreciated by those of ordinary skill in the art that wide variety of human pose estimation algorithm exist and that many different human pose estimation algorithms can be suitable adapted to determining the location of the face of each person in the frame.

The process 200 continues with generating anonymized frames by blurring portions the respective frame corresponding to the location of the face of each person (block 240). Particularly, for each frame in the video file, the processor 102 generates an anonymized frame based on the original frame by blurring the location or region within the frame that corresponds to the face of each person. In the example of FIG. 3, an image anonymized image frame 242 includes two passengers in the back seat of a vehicle cabin. As can be seen, regions 244 and 246 of the anonymized image frame 242 corresponding to the faces of the two passengers are blurred such that the passengers cannot be recognized or personally identified.

The process 200 continues with, in response to an error occurring in the determination of the location of the face of each person, generating the corresponding anonymized frame by blurring portions the frame corresponding to an entirety of each person (block 250). Particularly, for each frame in the video file, the processor 102 determines whether any errors occurred in the determination of the location of the face of each person in the frame. For example, in some cases, the human pose estimation algorithm may fail to determine key points or coordinates within the frame that correspond to the face of each person, or may determine key points or coordinates that can be determined to implausible or inaccurate based on some validation process or heuristic. In response to such an error occurring, the processor 102 generates an anonymized frame based on the original frame by blurring a location or region within the frame that corresponds to the entirety of each person. In the example of FIG. 3, an anonymized image frame 252 includes two passengers in the back seat of a vehicle cabin. As can be seen, a larger region 254 of the anonymized image frame 242 corresponding to the entirety of the two passengers is blurred such that the passengers cannot be recognized or personally identified. In this way, it is ensured that the anonymized image frame properly obscures the faces of the people in the frame, even when the precise location of the face of each person cannot be determined.

Finally, the process 200 continues with storing the anonymized video file (block 260). Particularly, the processor 102 writes the anonymized image frames to the anonymized database 28. In at least some embodiments, the processor 102 recombines the anonymized image frames to form an anonymized video file and stores the anonymized video file in the anonymized database 28.

It will be appreciated by those of ordinary skill in the art that the process 200 for anonymizing image frames of video data can be equivalently applied to images that are not part of a video. Accordingly, the equivalent process for anonymizing non-video image data by blurring the faces of people in the images is not separately described herein.

Figure 4:
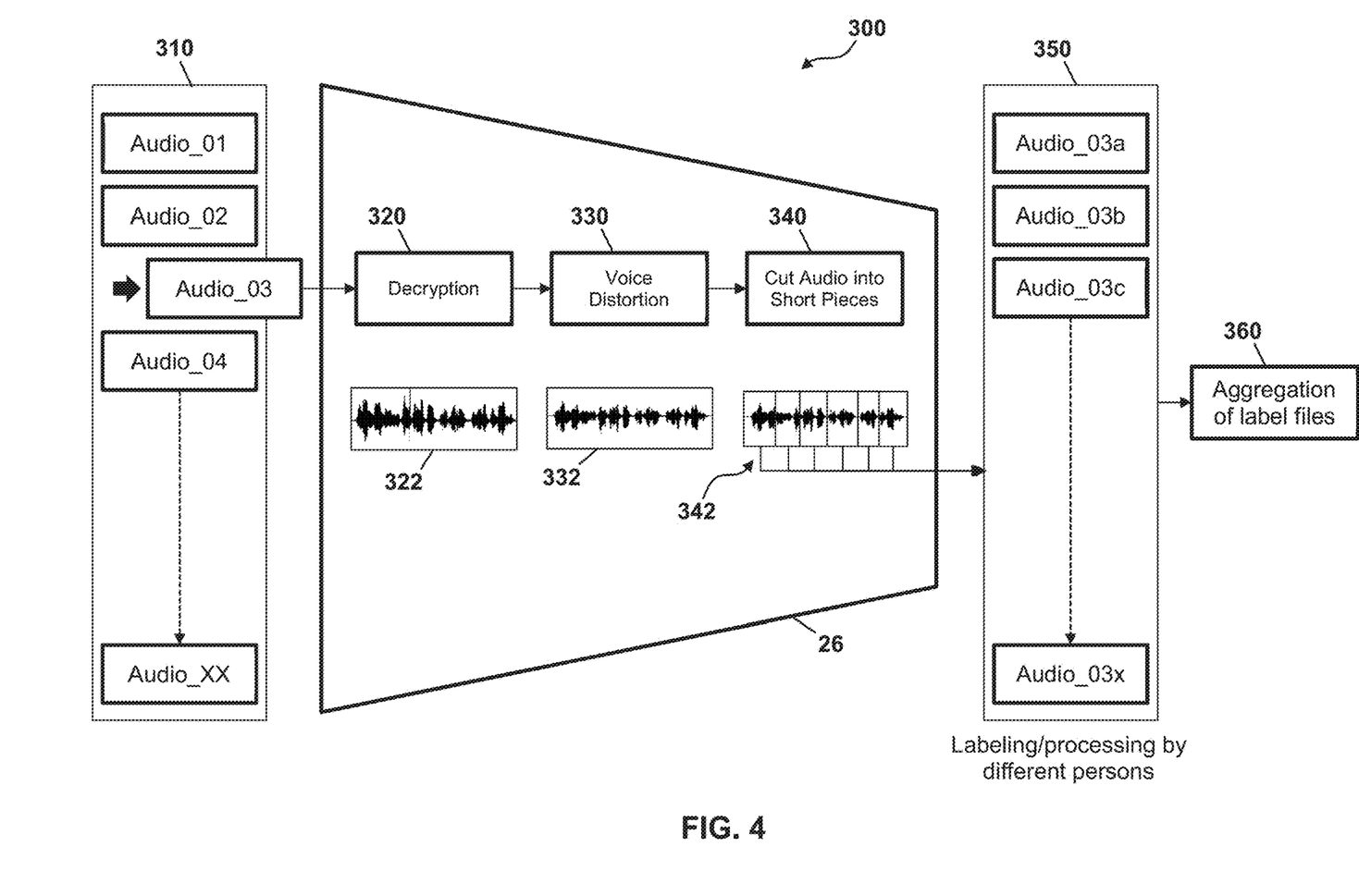
FIG. 4 shows a process for anonymizing audio data to distort the voices and decontextualize the words spoken by people in the audio, such that they cannot be recognized or personally identified.

FIG. 4 shows a process 300 for anonymizing audio data to distort the voices and decontextualize the words spoken by people in the audio, such that they cannot be recognized or personally identified. The process 300 begins with a step of receiving an audio file (block 310) and, if necessary, decrypting the audio file (block 320). Particularly, the processor 102 of the data storage backend 20 reads from the data storage devices 120 an individual audio file (e.g., "Audio_03") from a plurality of audio files stored in the non-anonymous data 22. In at least some embodiments, each individual file of the non-anonymous data 22 is encrypted, for example with a unique key associated with an end user of the product or service from which the data is collected. In these cases, the processor 102 decrypts the audio file using the appropriate key.

The process 300 continues with distorting the voice of each person in the audio clip of the audio file (block 330). Particularly, the processor 102 generates a distorted audio clip 332 by distorting a voice of each person in the raw audio clip 322 of the audio file. In some embodiments, the processor 102 generates the distorted audio clip by distorting the entire audio clip, thereby distorting the voice of each person in the audio clip. Alternatively, in some embodiments, the processor filters or otherwise processes the audio clip to isolate the voice of each person in the audio clip, distorts the isolated voices, and then recombines the distorted voices with the background audio to generate the distorted audio clip. It will be appreciated by those of ordinary skill in the art that a wide variety of voice distortion techniques can be suitably used to mask the identity of recorded speech, while maintaining the understandability of the speech.

The process 300 continues with cutting the audio clip into a plurality of shorter audio segments (block 340). Particularly, the processor 102 segments the distorted audio clip into a plurality of anonymized audio clip segments 342. In some embodiments, the processor 102 segments the distorted audio clip into anonymized audio clip segments 342 each having a predetermined duration (e.g. 10 seconds). In some embodiments, the processor 102 segments the distorted audio clip into anonymized audio clip segments 342 each having variable durations around a predetermined duration (e.g. 10±2 seconds). In one embodiment, the processor 102 determines the variable durations of the anonymized audio clip segments 342 so as to avoid splitting any spoken words across two segments. In other words, the processor 102 splits the audio clip only at times between spoken words.

The process 300 continues with storing the anonymized audio clips segment files (block 350). Particularly, the processor 102 writes the anonymized audio clip segments 342 to the anonymized database 28 as a plurality of separate audio files (e.g., "Audio_03a," "Audio_03b," "Audio_03c," etc.). Each of these separate audio files will be assigned to different human labelers 50 for labeling. In this way, the segmentation of the audio clip has the effect of decontextualizing and, thus, further anonymizing the audio clip because no individual human labeler 50 has the full context of what is heard in the audio clip segments.

Finally, once labels are received for the audio clips segments, the process 300 continues with aggregating the received labels (block 360). Particularly, the processor 102 receives the labels from the human labelers 50 for each the plurality of separate audio files and stores the labels in association with one another and in association with the original raw audio file, either in the database 22 or in some other database designated for labeled data (not shown).

Figure 5:
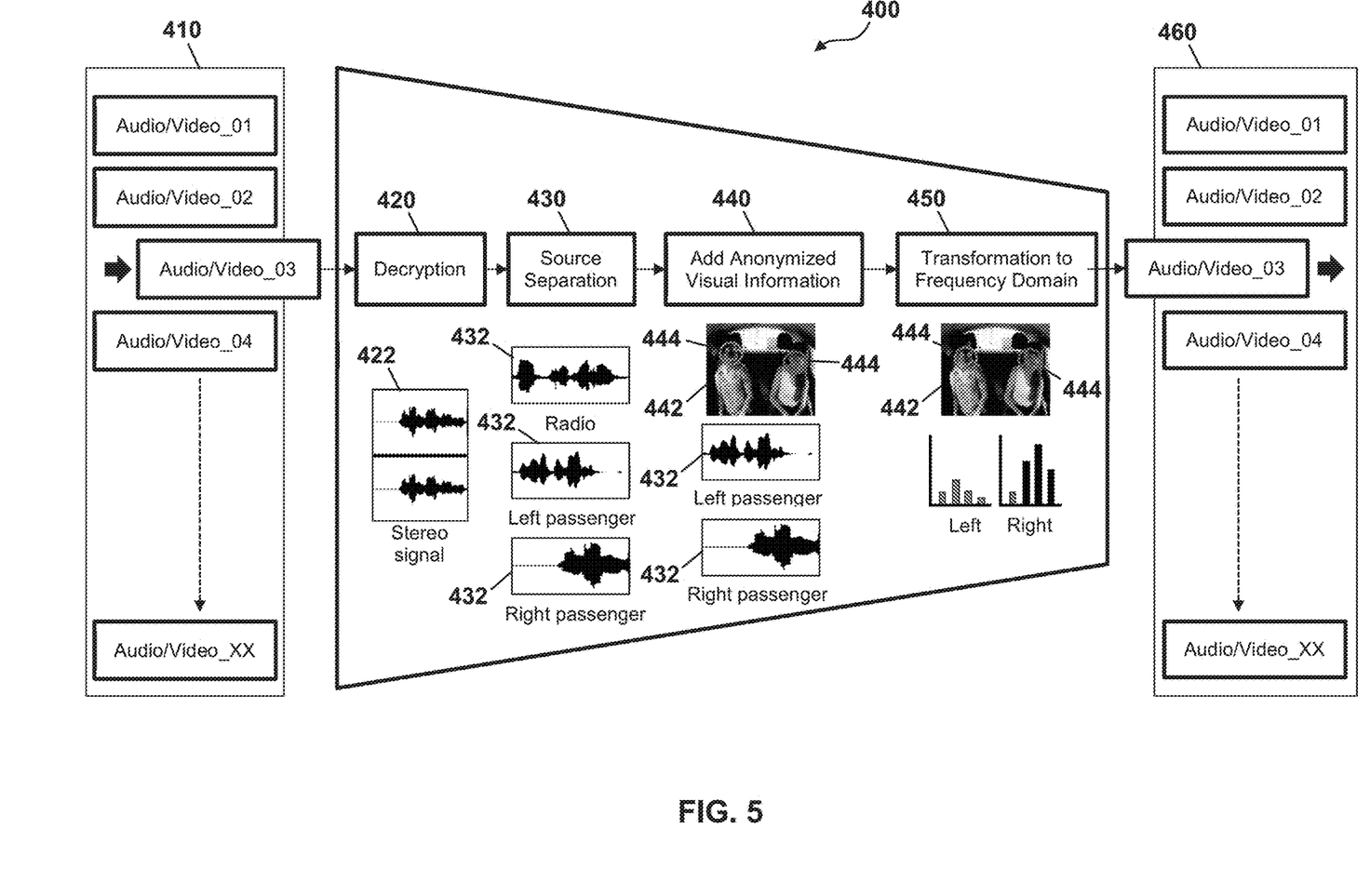
FIG. 5 shows a process for anonymizing audio/video data such that people in the audio/video data cannot be recognized or personally identified.

FIG. 5 shows a process 400 for anonymizing audio/video data such that people in the audio/video data cannot be recognized or personally identified. The process 400 begins with a step of receiving an audio/video file (block 410) and, if necessary, decrypting the audio/video file (block 420). Particularly, the processor 102 of the data storage backend 20 reads from the data storage devices 120 an individual audio file and associated video or image file (e.g., "Audio/Video_03") from a plurality of audio/video files stored in the non-anonymous data 22. The individual audio file and associated video or image file are generally captured during a same period of time by the data source 24. In at least some embodiments, each individual file of the non-anonymous data 22 is encrypted, for example with a unique key associated with an end user of the product or service from which the data is collected. In these cases, the processor 102 decrypts the audio file and associated video or image file using the appropriate key(s).

The process 400 continues with separating the audio sources of the audio clip of the audio/video file (block 430). Particularly, the processor 102 generates isolated audio clips 432 by isolating the different audio sources of the raw multi-channel audio clip 422 of the audio file (i.e., audio from multiple microphones arranged in the vehicle). More particularly, the processor 102 generates isolated audio clips 432 that isolate the voice of each person (e.g., "Left passenger" and "Right passenger") by removing background noise in the audio clip and voice of each other person in the audio clip. In some embodiments, the processor 102 generates an isolated audio clip 432 that isolates the background noise in the audio clip (e.g., "Radio"). It will be appreciated by those of ordinary skill in the art that a wide variety of voice isolation techniques or other audio source isolation techniques can be suitably used to isolate the different audio sources of the raw multi-channel audio clip 422.

The process 400 continues with adding anonymized visual information to the video of the audio/video file indicating an emotional state of each person in the audio/video file (block 440). Particularly, the processor 102 detects a face of each person in the video and determines a classification of an emotional state of each person based on the face of each person. In at least one embodiment, the processor 102 executes a machine learning model (e.g., one of the machine learning models 32) to detect the face of each person in the video and determine the classification of an emotional state of each person. The possible classifications may include, for example, "Happy," "Angry," "Sad," "Stressed," etc. It will be appreciated by those of ordinary skill in the art that a wide variety of image/video processing techniques can be suitably used to detect a face of each person in the video and determine a classification of an emotional state of each person based on the face of each person.

Based on the determined classification, the processor 102 generates an anonymized video 442 by adding graphical elements 444 to the raw video. The graphical elements 444 are configured to indicate the classification of the emotional state of each person. In at least one embodiment, the graphical elements 444 are added to the video such that the graphical elements obscure the face of each person. For example, the graphical elements 444 may include emojis or similar images that are placed on top of the face of each person so as to obscure the face. The emojis or other similar images are selected such that they represent the determined classification of the emotional state of each person (e.g., smiling face emoji, frowning face emoji, etc.). Alternatively, in some embodiments, text information simply can be added to the video to indicate the determined classification of the emotional state of each person. In such embodiments, the faces of each person in the video should be blurred in the same manner discussed above with respect to the process 200.

It will be appreciated by those of ordinary skill in the art that, in some embodiments, an anonymized image including such graphical elements can be equivalently generated based on an image associated with the audio clip using the same process discussed above. Accordingly, the process for adding visual information to an associated image file is not separately described herein.

The process 400 continues with transforming the isolated audio clips into the frequency domain (block 450). Particularly, the processor 102 determines anonymized audio clips 452 by converting the isolated audio clips in the frequency domain, using an algorithm such as the fast Fourier transform. It will be appreciated by those of ordinary skill in the art, however, that a wide variety of algorithms might be suitably used to convert the isolated audio clips from the time domain into the frequency domain.

Finally, the process 400 continues with storing the anonymized audio/video files (block 460). Particularly, the processor 102 writes the anonymized (frequency domain) audio clips 452 and the anonymized video (which includes the visual information) 442 to the anonymized database 28 (e.g., "Audio/Video_03").

Data Labeling

Once the non-anonymous data 22 is anonymized by the anonymization engine 26, the anonymized data 28 is provided to a team of human labelers 50 to add one or more labels to the data. As noted above, the particular labels that that are added by the human labelers 50 generally related closely to tasks performed by the machine learning models 32 and, thus, the particular labels will vary widely depending on task performed by the machine learning models 32.

For each anonymized data file of anonymized data 28, the processor 102 operates the network communications module 108 to transmit the respective anonymized data file to one of the personal computing devices 40 and to receive at least one label for the anonymized data file from the personal computing devices 40. Once labels are received for the anonymized data file, the processor 102 stores the labels in association with the corresponding non-anonymous data file, either in the database 22 or in some other database designated for labeled data (not shown). In this way, the non-anonymous data 22 can be labeled by the human labelers 50, while generally only exposing the human labelers 50 to the corresponding anonymized data 28.

From the perspective of the personal computing devices 40, each human labeler 50 operates a respective personal computing device 40 to access the anonymized data 28 and provide labels for the anonymized data 28. Particularly, the processor 130 operates the network communications module 138 to receive an anonymized data file from the data storage backend 20 via the web API 30. The processor 130 operates at least one output device, such as the display screen 134 and/or a speaker, to output the anonymized data file. The human labeler 50 provides inputs via the user interface 136, which are received by the processor 130 and which indicate at least one label for the anonymized data file. Finally, the processor 130 operates the network communications module 138 to transmit at least one label for the anonymized data file to the data storage backend 20.

In the case of anonymized videos, individual anonymized image frames from an anonymized video, and anonymized images (e.g., generated by the process 200 of FIG. 3), the processor 130 operates the display screen 134 to display the anonymized video, individual anonymized video frame, or anonymized image. By viewing the displayed video, image frame, or image, the human labeler 50 determines appropriate labels for the scene and/or the people and provides user inputs via the user interface 136 to provide the labels.

Figure 6:
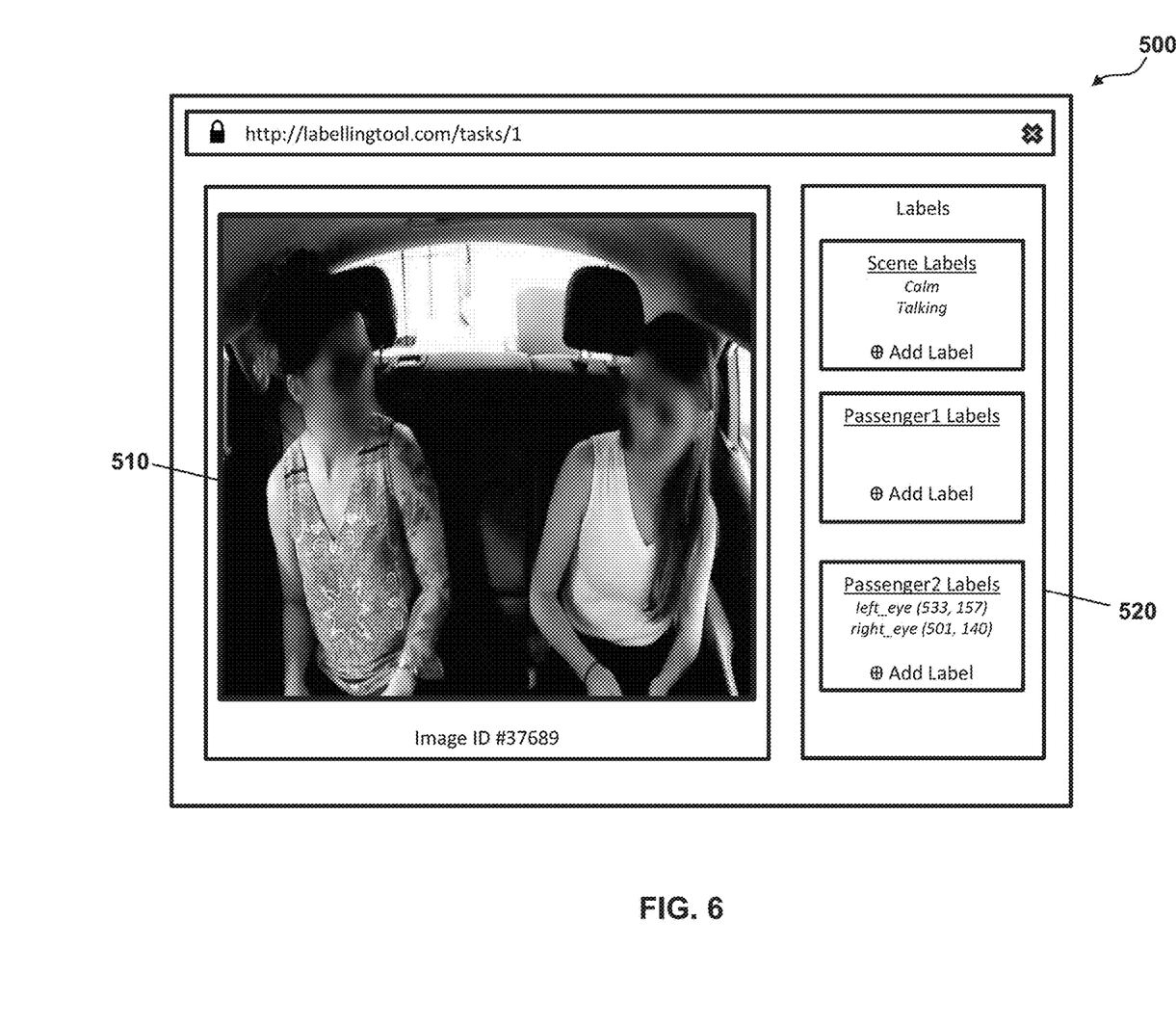
FIG. 6 shows an exemplary graphical user interface of a data labeling tool for labeling an anonymized video, an anonymized video frame, or anonymized image.

FIG. 6 shows an exemplary graphical user interface 500 of a data labeling tool for labeling an anonymized video, an anonymized image frame of a video, or an anonymized image. The graphical user interface 500 is provided on the display screen 134 of the personal computing device 40. The graphical user interface 500 includes a display of the anonymized media 510 (i.e., an anonymized video, an anonymized image frame of a video, or an anonymized image) and a labeling menu 520. By interacting with the labeling menu 520, the human labeler 50 can add labels for the anonymized media 510. The labels may, for example, include one or more broad classifications of the scene (e.g., "calm" and "talking"). Additionally, the labels may, for example, include one or more detailed labels for particular people in the scene (e.g., coordinates for the second passenger's left and right eyes). Depending on the type of label, the human labeler 50 may select a label from a predetermined list of acceptable labels or, in the case of coordinate labels, select a label and then click a corresponding location in the display of the anonymized media 510.

In some embodiments, the human labeler 50 is provided with limited access to the non-anonymous data that corresponds to the anonymized data file that is to be labeled. Thus, in some embodiments, the processor 102 operates the network communications module 108 to transmit at least a portion of the corresponding non-anonymous data file, alongside the anonymized data file.

Figure 7:
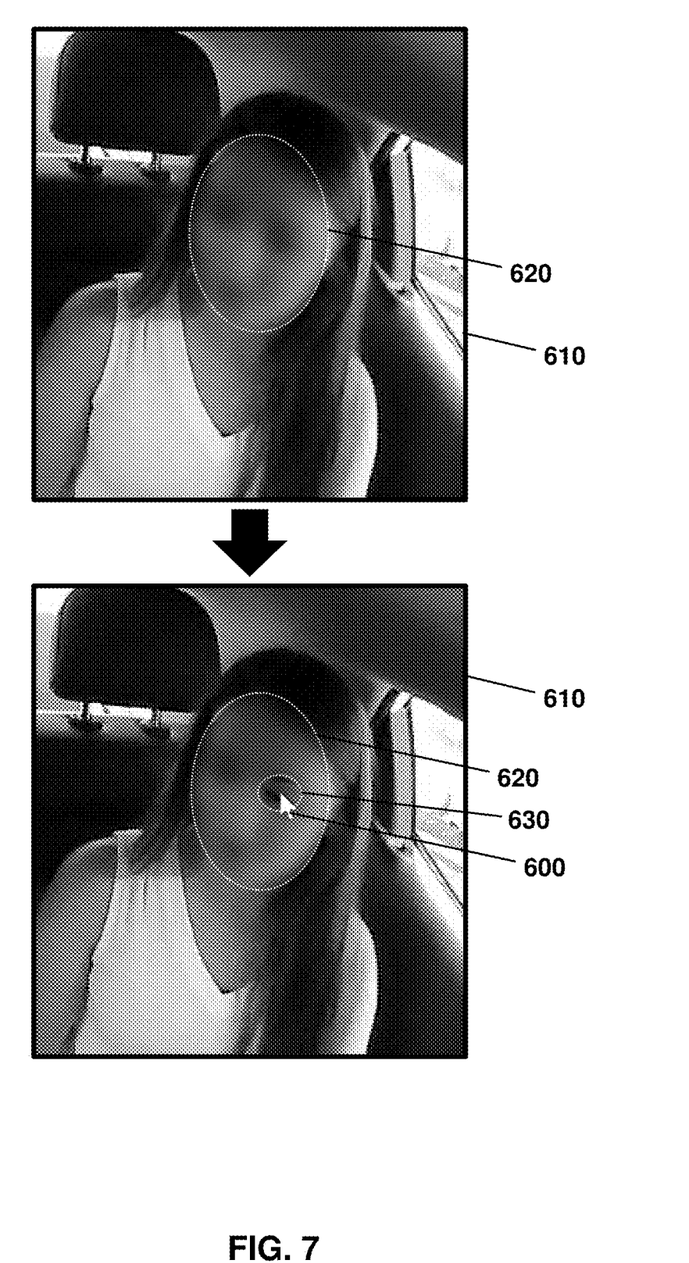
FIG. 7 shows an unblurring of an area around a cursor to enable precise labelling of facial landmarks.

In the particular case of labeling an anonymized video, an anonymized image frame of a video, or an anonymized image, the graphical user interface of the data labeling tool displays a movable cursor that is movable on the display screen 134 via the user interface 136. As shown in FIG. 7, when the human labeler 50 moves the cursor 600 over a blurred portion 620 of the anonymized media 610 (i.e., over the blurred face), the graphical user interface displays a blended combination of the anonymized media and the original non-anonymous media. Particularly, the blended combination includes a portion 630 around the cursor 600, which displays the corresponding image data of original non-anonymous media. The remaining portions of the blended combination display the corresponding image data of the anonymized media. In this way, the human labeler 50 can precisely label facial landmarks (e.g., coordinates for the eyes of the person) using a small unblurred context around the cursor 600. However, the human labeler 50 cannot reconstruct the entire face of the person, such that the anonymity of the person is maintained.

In the case of anonymized audio clips or anonymized audio clip segments (e.g., generated by the process 300 of FIG. 5), the processor 130 operates a speaker to play the anonymized audio clip or anonymized audio clip segment. In some embodiments, the processor 130 operates the display screen 134 to display a waveform of the anonymized audio clip or anonymized audio clip segments. A graphical user interface that is analogous to the graphical user interface 500 of FIG. 6 may be provided on the display screen 134. By listening to and/or viewing the waveform of the anonymized audio clip or anonymized audio clip segment, the human labeler 50 determines appropriate labels for the scene and/or the people and provides user inputs via the user interface 136 to provide the labels.

In the case of anonymized audio/video data (e.g., generated by the process 400 of FIG. 5), the processor 130 operates the display screen 134 to display the anonymized video/images having the graphical elements indicating the emotion state of each person and to display a frequency domain graph representing the anonymized audio clip or anonymized audio clip segment. However, since the audio clip was converted into the frequency domain in the anonymization process, the anonymized audio clip or anonymized audio clip segment is not listened to by the human labeler 50. A graphical user interface that is analogous to the graphical user interface 500 of FIG. 6 may be provided on the display screen 134. By viewing the anonymized video/images and studying the frequency domain graph representing the anonymized audio clip or anonymized audio clip segment, the human labeler 50 determines appropriate labels for the scene and/or the people and provides user inputs via the user interface 136 to provide the labels.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for labeling data, the method comprising:
   storing, in a memory of a server, a plurality of data files, the data files including at least one of videos, images, and audio clips, at least some of the plurality of data files including personally identifiable information of individual people;
   generating, with a processor of the server, a plurality of anonymized data files by removing the personally identifiable information from each of the plurality of data files, each of the plurality of anonymized data files being generated based on a corresponding one of the plurality of data files; and
   labeling the plurality of data files by, for each respective anonymized data file in the plurality of anonymized data files:
      transmitting, with a transceiver of the server, the respective anonymized data file to a respective client device in a plurality of client devices;
      receiving, with the transceiver, at least one label for the respective anonymized data file from the respective client device; and
      storing, in the memory, the at least one label in association with a respective data file in the plurality of data files that corresponds to the respective anonymized data file,
   wherein the generating the plurality of anonymized data files includes, for a first audio clip in the plurality of data files, (i) generating, with the processor, an isolated audio clip by isolating a voice of a first person in the first audio clip and (ii) determining, with the processor, a first anonymized audio clip by converting the isolated audio clip into a frequency domain.

2. The method according to claim 1, the generating the plurality of anonymized data files further comprising, for each respective frame of a first video in the plurality of data files:
   determining, with the processor, a location of a face of each person in the respective frame; and
   generating, with the processor, a respective anonymized frame of a first anonymized video by blurring portions of the respective frame corresponding to the location of the face of each person.

3. The method according to claim 2, the generating the plurality of anonymized data files further comprising, for each respective frame of the first video:
   determining, with the processor, whether an error occurred in the determination the location of the face of each person; and
   generating, with the processor, the respective anonymized frame of the first anonymized video by blurring portions of the respective frame corresponding to an entirety of each person in the respective frame, in response to determining that the error occurred.

4. The method according to claim 1, the generating the plurality of anonymized data files further comprising:
   determining, with the processor, a location of a face of each person in a first image in the plurality of data files; and
   generating, with the processor, an anonymized image by blurring portions of the first image corresponding to the location of the face of each person.

5. The method according to claim 1, the generating the plurality of anonymized data files further comprising:
   generating, with the processor, a distorted audio clip by distorting a voice of each person in a first audio clip in the plurality of data files; and
   segmenting, with the processor, the distorted audio clip into a first plurality of anonymized audio clip segments.

6. The method according to claim 5, the labeling the plurality of data files further comprising, for the first plurality of anonymized audio clip segments:
   transmitting, with the transceiver, each respective anonymized audio clip segment in the first plurality of anonymized audio clip segments to a different client device in the plurality of client devices;
   receiving, with the transceiver, at least one label for each respective anonymized audio clip segment in the first plurality of anonymized audio clip segments from the different client device in the plurality of client devices; and storing, in the memory, the at least one label received for each respective anonymized audio clip segment in the first plurality of anonymized audio clip segments in association with the first audio clip.

7. The method according to claim 1, the generating the isolated audio clip further comprising at least one of:
removing, with the processor, background noise from the first audio clip; and
removing, with the processor, a voice of a second person from the first audio clip.

8. The method according to claim 1, the generating the plurality of anonymized data files further comprising, for a first video in the plurality of data files that was captured during a same time period as the first audio clip:
detecting, with the processor, a face of the first person in the first video;
determining, with the processor, a classification of an emotional state of the first person based on the face of the first person; and
generating, with the processor, a first anonymized video by adding graphical elements to the first video, the graphical elements being configured to indicate the classification of the emotional state of the first person.

9. The method according to claim 8, the generating the first anonymized video further comprising at least one of:
adding, with the processor, the graphical elements to the first video such that the graphical elements obscure the face of the first person; and
blurring portions of the first video corresponding to the face of the first person in the first video.

10. The method according to claim 8, the labeling the plurality of data files further comprising, for the first anonymized audio clip and the first anonymized video:
transmitting, with the transceiver, the first anonymized audio clip and the first anonymized video to the respective client device in the plurality of client devices;
receiving, with the transceiver, at least one label for the first anonymized audio clip and the first anonymized video from the respective client device; and
storing, in the memory, the at least one label in association with the first audio clip and the first video.

11. The method according to claim 10, the labeling the plurality of data files further comprising, for the first anonymized audio clip and the first anonymized video:
displaying, with a display device of the respective client device, the first anonymized video; and
displaying, with the display device, the first anonymized audio clip as a frequency domain graph.

12. The method according to claim 1, the labeling the plurality of data files by further comprising, for each respective anonymized data file in the plurality of anonymized data files:
outputting, with an output device of the respective client device, the respective anonymized data file; and
receiving, via a user interface of the respective client device, inputs indicating the at least one label for the respective anonymized data file.

13. The method according to claim 1, the labeling the plurality of data files further comprising, for a respective frame of a first anonymized video in the plurality of anonymized data files:
displaying, with a display of the respective client device, the respective frame of the first anonymized video; and receiving, via a user interface of the respective client device, inputs indicating the at least one label for the respective frame of the first anonymized video.

14. The method according to claim 1, the labeling the plurality of data files further comprising, for a respective frame of the first anonymized video in the plurality of anonymized data files:
transmitting, with the transceiver, the respective frame of the first anonymized video and a respective frame of a first video of the plurality of data files that corresponds to the respective frame of the first anonymized video to the respective client device, the respective frame of the first video including a face of a person and the respective frame of the first anonymized video including a blurred face of the person;
displaying, with a display of the respective client device, a movable cursor that is movable on the display via a user interface of the respective client device; and
displaying, with the display, a blended combination of the respective frame of the first anonymized video and the respective frame of the first video, the blended combination being such that a portion of the blended combination around the movable cursor displays the respective frame of the first video and remaining portions of the blended combination display the respective frame of the first anonymized video.

15. The method according to claim 1, the labeling the plurality of data files further comprising, for a first image in the plurality of anonymized data files:
displaying, with a display of the respective client device, the first image; and
receiving, via a user interface of the respective client device, inputs indicating the at least one label for the first image.

16. The method according to claim 1, the labeling the plurality of data files further comprising, for a first audio clip in the plurality of anonymized data files:
outputting, with a speaker of the respective client device, the first audio clip; and
receiving, via a user interface of the respective client device, inputs indicating the at least one label for the first audio clip.

17. The method according to claim 1 further comprising:
training, with the processor, a machine learning model using the plurality of data files and the at least one label stored in association with each respective data file in the plurality of data files; and
processing, with the processor, new data files received from a data source based using the trained machine learning model.

18. A system for labeling data, the system comprising:
a transceiver configured to communicate with a plurality of client devices;
a memory configured to store a plurality of data files, the data files including at least one of videos, images, and audio clips, at least some of the plurality of data files including personally identifiable information of individual people; and
a processor operably connected to the transceiver and the memory, the processor configured to:
generate a plurality of anonymized data files by removing the personally identifiable information from each of the plurality of data files, each of the plurality of anonymized data files being generated based on a corresponding one of the plurality of data files; and
label the plurality of data files by, for each respective anonymized data file in the plurality of anonymized data files, (i) operating the transceiver to transmit the respective anonymized data file to a respective client device in the plurality of client devices, (ii) operating the transceiver to receive at least one label for the respective anonymized data file from the respective client device, (iii) and writing, to the memory, the at least one label in association with a respective data file in the plurality of data files that corresponds to the respective anonymized data file, wherein the generating the plurality of anonymized data files includes, for a first audio clip in the plurality of data files, (i) generating, with the processor, an isolated audio clip by isolating a voice of a first person in the first audio clip and (ii) determining, with the processor, a first anonymized audio clip by converting the isolated audio clip into a frequency domain.

19. A non-transitory computer-readable medium for labeling data, the computer-readable medium storing program instructions that, when executed by a processor, cause the processor to:

read, from a memory, a plurality of data files, the data files including at least one of videos, images, and audio clips, at least some of the plurality of data files including personally identifiable information of individual people generate a plurality of anonymized data files by removing the personally identifiable information from each of the plurality of data files, each of the plurality of anonymized data files being generated based on a corresponding one of the plurality of data files; and label the plurality of data files by, for each respective anonymized data file in the plurality of anonymized data files, (i) operating a transceiver to transmit the respective anonymized data file to a respective client device in a plurality of client devices, (ii) operating the transceiver to receive at least one label for the respective anonymized data file from the respective client device, (iii) and writing, to the memory, the at least one label in association with a respective data file in the plurality of data files that corresponds to the respective anonymized data file, wherein the labeling the plurality of data files further includes, for a respective frame of the first anonymized video in the plurality of anonymized data files, (i) transmitting, with the transceiver, the respective frame of the first anonymized video and a respective frame of a first video of the plurality of data files that corresponds to the respective frame of the first anonymized video to the respective client device, the respective frame of the first video including a face of a person and the respective frame of the first anonymized video including a blurred face of the person, (ii) displaying, with a display of the respective client device, a movable cursor that is movable on the display via a user interface of the respective client device; and (iii) displaying, with the display, a blended combination of the respective frame of the first anonymized video and the respective frame of the first video, the blended combination being such that a portion of the blended combination around the movable cursor displays the respective frame of the first video and remaining portions of the blended combination display the respective frame of the first anonymized video.

* * * * *